United States Patent

[11] 3,602,067

[72] Inventor Arthur E. Wetherbee, Jr.
Newington, Conn.
[21] Appl. No. 859,013
[22] Filed Sept. 18, 1969
[45] Patented Aug. 31, 1971
[73] Assignee United Aircraft Corporation
East Hartford, Conn.

[54] FLYWHEEL
7 Claims, 9 Drawing Figs.

[52] U.S. Cl. .................................................. 74/572
[51] Int. Cl. ......................................................... F16f 15/30
[50] Field of Search............................................ 74/572;
233/1, 27, 13; 264/103, 108

[56] References Cited
UNITED STATES PATENTS
3,296,886 1/1967 Reinhart, Jr. ................. 74/572
3,363,479 1/1968 Pickels ......................... 74/572

Primary Examiner—William F. O'Dea
Assistant Examiner—F. D. Shoemaker
Attorney—Charles A. Warren ABSTRACT: A rotary device, for example, a flywheel, is built up of a plurality of layers of circumferentially extending high strength filaments embedded in a matrix with the matrix fraction or matrix composition controlled such that the modulus ratio, that is the ratio of the modulus of elasticity in the circumferential direction, to the modulus of elasticity in the radial direction may be controlled to produce the most effective high energy wheel. By effective control of the modulus ratio a flywheel type of device of very high energy may be produced that will not fail prematurely in the conventional burst-type of failure, i.e., a failure by radial cracking resulting from overstressing in a circumferential direction. In effect, the control of the modulus ratio is a balancing of the strength distribution with the stress distribution.

INVENTOR.
ARTHUR E. WETHERBEE, JR.

BY Charles A Warren

ATTORNEY 3,602,067

FLYWHEEL

BACKGROUND OF THE INVENTION

Laminated flywheels are known in which the wheel is made up of a plurality of radially laminated rings concentric to the axis and the outer rings having a higher circumferential modulus of elasticity than the inner rings. The rings are all held together by a single type of matrix such that the radial modulus of the matrix material is the same throughout the wheel. Such constructions do not permit the balancing of stress distribution with strength distribution to the necessary extent to obtain the best performance wheel.

It is also old to have a wheel made up of a thermoplastic of uniform density with particulate matter embedded therein in increasing concentration toward the outer diameter. Such a construction does not produce the desired and necessary changes in the modulus ratio or the strength characteristics between inner and outer diameters to provide for stress compatibility throughout the wheel thereby to obtain the high performance wheel desired for extremely high-speed operation.

SUMMARY OF THE INVENTION

The principle feature of the present invention is a flywheel rim construction in which the modulus ratio is controlled and varied between inner and outer diameters to permit extreme high-speed rotation without overloading the material at any radius to cause failure.

A further feature in practical wheel designs is to create a condition of strain compatibility at critical points such as where an intermediate disc joins the rim. This means that adjacent portions of the wheel strain by similar amounts due to their normal loading. This minimizes the loads which must be carried across such joints and also minimizes interactive loads at the joints. This is particularly important when materials having greatly different moduli are adjacent in a structure.

According to the present invention, the flywheel is made up of circumferentially extending continuous filaments embedded in a matrix with a control of either the filaments or the matrix, for example, either in composition of matrix, cure of the matrix or ratio of matrix to filaments to change the modulus ratio at different radii. The modulus ratio preferably increases toward the inner diameter.

DESCRIPTION OF THE PREFERRED EMBODIMENT

Figure 1:
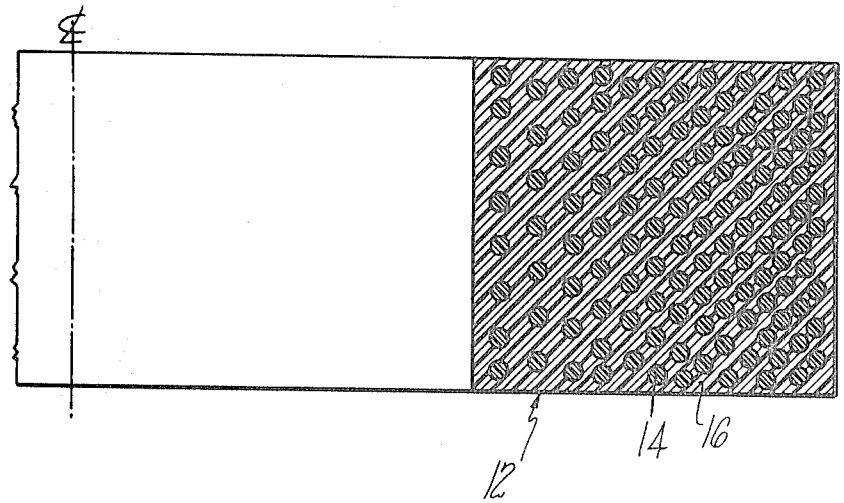
FIG. 1 is a sectional view through a wheel embodying the invention.

The flywheel of the invention is intended for high-speed rotation and is so constructed that the radial stresses and circumferential stresses are kept within the limits of the material of the flywheel. As shown in FIG. 1, the flywheel or disc 12 is made up of circumferentially extending continuous filaments or rings 14 embedded in a matrix 16. These filaments may be in the form of wires, circumferentially wound about the axis of the wheel with the matrix serving to hold the wires in position. The desired modulus ratio, that is to say the ratio of the modulus of elasticity of the composite in the circumferential direction to the modulus of the composite in the radial direction may be obtained in several ways. For example, the concentration of filaments or the filament fraction may be decreased and the percentage of matrix in the composite may be increased at different radii. In the arrangement shown the filament fraction is decreased in a direction toward the inner diameter of the disc, as shown. The effect of this is to increase within certain filament fraction limits the modulus ratio toward the inner diameter. The maximum modulus ratio occurs when the filament fraction is about 45 percent. Increasing or decreasing the filament fraction from this amount will lower the modulus ratio.

This change in the matrix percentage or filament fraction may be accomplished in a step-by-step manner, producing a series of layers each having a different filament fraction, or the change may be gradual as shown with the percentage of matrix increasing toward the inner diameter.

It will be understood that there is a practical limit to the volume fraction of the matrix and it is preferably varied from a minimum of about 30 percent (filament volume 70 percent) to a maximum of about 70 percent (filament volume 30 percent). The radial and circumferential strength and modulus properties will thus differ significantly between these two limits. Ideally, with the proper selection of matrix material and filament material, the local stresses and strength may be kept in balance at all radii of the wheel.

Since the filament fraction is varied from inner to outer diameter, it will be clear that the modulus ratio is also varied over the same range and thereby the loading in both radial and circumferential directions will be kept within the limits of the material. When the term "modulus ratio" is used, it is intended to mean the modulus of each volume of the composite of the filament and matrix and not the modulus of either the filament or matrix individually. The term stress means the loading at any point when the wheel is in operation, the strain is the change in dimension at any point. These terms all apply to the composite and not to either filament or matrix independently.

Figure 2:
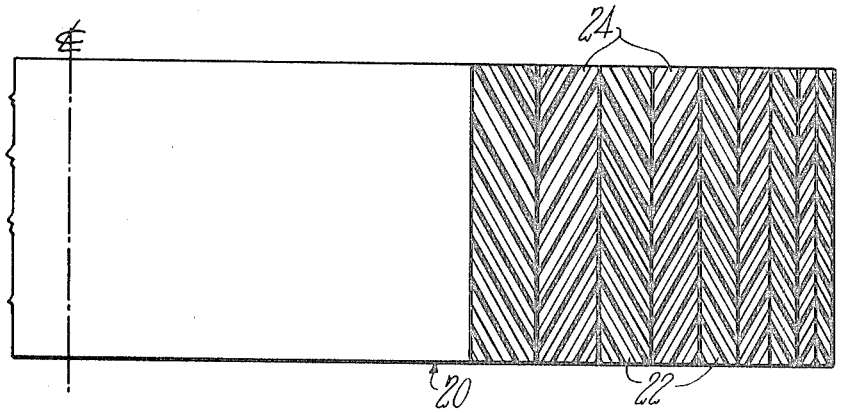
FIG. 2 is a sectional view through a modification.

An alternative to the simplified wheel or disc of FIG. 1 is shown in FIG. 2 where the disc 20 is made up of concentric rings 22 and 24, the former constituting a laminate which is the equivalent of filaments and the latter being the matrix. Here again, as in FIG. 1, filament fraction decreases toward the inner diameter. The rings 22, (the filament equivalent) may be continuous rings of a homogenous material but are preferably rings or wires of filaments embedded in a matrix to form each laminate. Preferably each laminate is the same as each other laminate or ring although in changing the matrix fraction it may be accomplished by changing the thickness of the individual rings between inner and outer diameter.

As in FIG. 1, the change of filament fraction is such that the stress distribution both radially and circumferentially is adjusted to limit the stresses below the physical strength of the materials. Obviously the matrix material is selected to provide the necessary bond between the filaments or laminate rings and the matrix itself.

Figure 3:
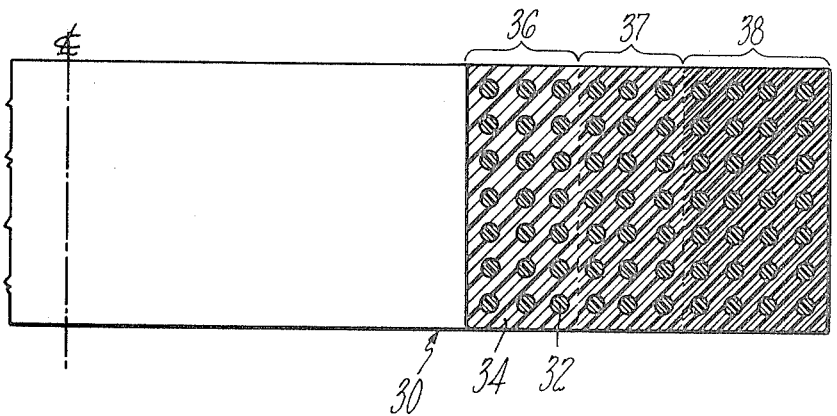
FIG. 3 is a sectional view of a further modification.

Another modification is shown in FIG. 3 where the disc 30 has the continuous circumferential filaments 32 held together by a matrix 34 as in FIG. 1, but the physical characteristics of the matrix material are varied between inner and outer diameters as represented by the increasingly denser shading toward the outer diameter. This is accomplished either by using different materials for the matrix at different diameters or by altering the matrix properties as by preferential curing or other treatment.

For example, the matrix may be a nitrile (Buna-N) formulation, the modulus of elasticity of which is affected by the time or temperature at which it is cured. Thus by selectively curing the inner portion 36 of the disc for 1½ hours at 295° F. and then assembling the inner two portions 36 and 37 for a further cure, then adding the outer portion 38 and curing the entire disc for 1½ hours at 295° F. the inner portions have a much longer cure and thus a lower modulus of elasticity than the outer portion.

Figure 4:
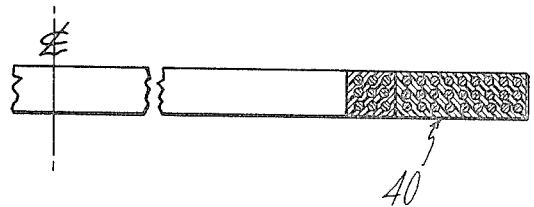
FIG. 4 is a schematic view showing a wheel made up of two different materials.

Alternatively, by varying the filament material or the matrix material or both at different diameters strength and stress characteristics may be changed as needed at these different diameters. As shown in FIG. 4, the outer three-fourths of a disc or wheel 40 may be made of filaments of "S" Fiberglas circumferentially extending and continuous as in FIG. 1 and embedded in a matrix of ERL 2256 and the inner one-fourth is made of "E" Fiberglas with a neoprene matrix. "E" Fiberglas and "S" Fiberglas are different forms of Fiberglas, one source of which is Owens-Corning. These fibers have moduli of elasticity respectively of $10.5\times10^6$ p.s.i. and $12.6\times10^6$ p.s.i. ERL 2256 is a resin made by Union Carbide and as used in this disc had a modulus of elasticity of about 650,000 p.s.i. Neoprene is an elastomer, one source of which is DuPont and as used in this disc had a modulus of elasticity for the inner portion of the wheel of 1,000 p.s.i. In both portions of the wheel the filament fraction was 65 percent by volume.

Figure 6:
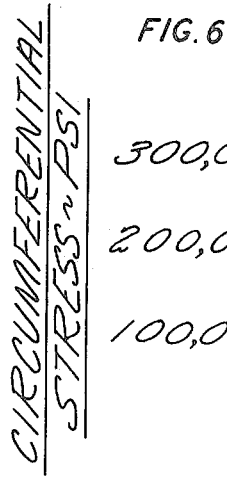
FIGS. 5 and 6 are plots of the stresses in a wheel of the type of FIG. 4.
Figure 5:
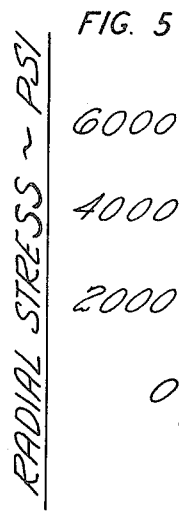

The stress distribution in this ring or wheel which had an inner radius of 8 inches and an outer radius of 10 inches is shown in full lines in FIGS. 5 and 6 and is compared to the stresses in dotted lines in a wheel composed entirely of "S" Fiberglas in an ERL 2256 matrix with a constant filament fraction of 65 percent at the same radii. FIG. 5 shows radial stress and FIG. 6 shows circumferential stress at different radii.

Figure 8:
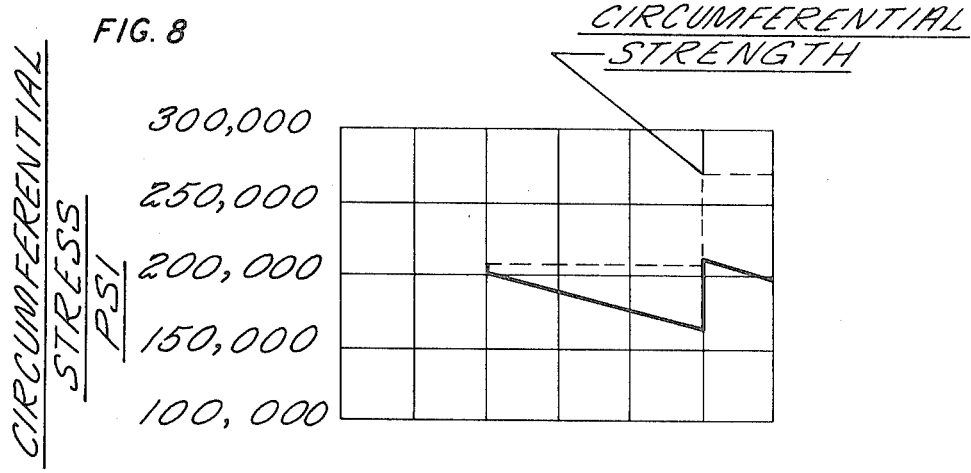
FIGS. 8 and 9 shown the stress distribution in the wheel of FIG. 7.
Figure 7:
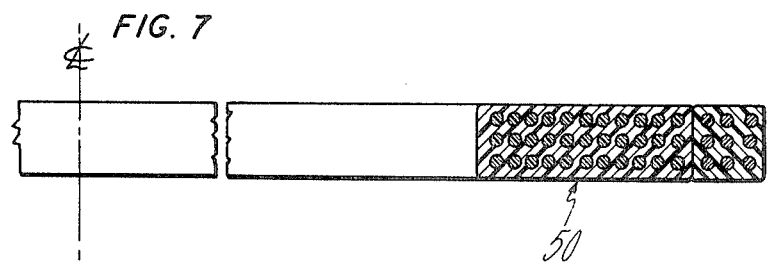
FIG. 7 is a schematic view of a wheel or disc made up of two portions differing in filament fraction.
Figure 9:
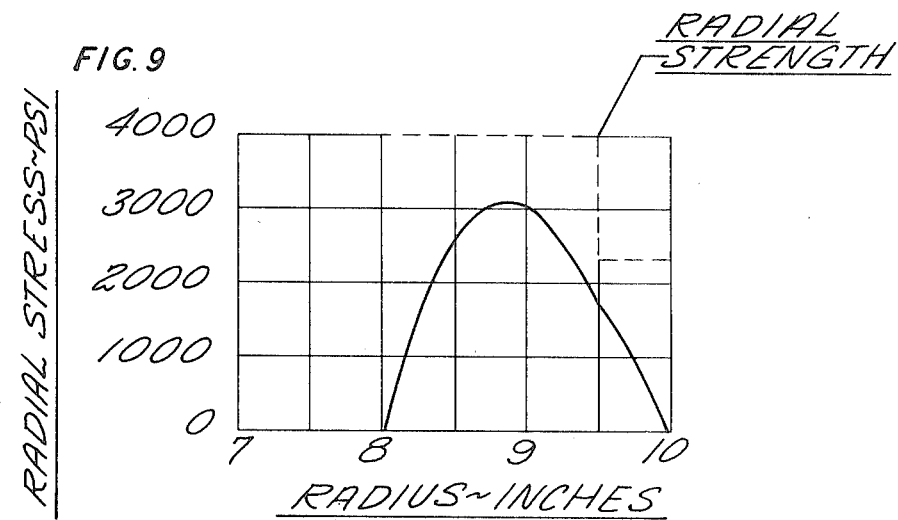

An example of a wheel in which the filament fraction is varied instead of the filament material is shown schematically in FIG. 7 where the wheel or disc 50 has an inner radius of 8 inches and an outer radius of 10 inches with the outer one-fourth made with a filament fraction of 65 percent and the inner three-fourths made with a filament fraction of 50 percent thereby adjusting the strength and stress characteristics at different diameters. The material used for this particular wheel was "S" Fiberglas and ERL 2256 throughout the disc. With this variation in the filament fraction the circumferential stress is kept below the effective strength of the composite in this direction as shown in FIG. 8 and the radial stress is kept below the effective strength of the composite in this direction as shown in FIG. 9. The stresses are shown in full lines and the effective strengths in dotted lines.

In a two-layer wheel of this type the two portions would preferably be bonded together by the same matrix material as used in making each portion. From these figures it will be apparent that a control over the percentage of the matrix with respect to the circumferentially extending continuous filament permits the construction of a wheel that will effectively balance the strength and stress distribution of the composite material. In this modification, as in the other modifications the wheel or disc is made up to have the necessary strength at all radii, and this is accomplished primarily by controlling the matrix either as to percentage, material, cure or other treatment that will impart the necessary strength and stress distribution of the composite at all diameters. Changing the matrix will change both circumferential and radial strength and will also change the stress distribution so that, based on the examples above described, a wheel can be produced that will be operable at high speeds for maximum energy storage. As above described a selection of different filaments combined with the control of the matrix gives a further control over the strength and stress characteristics of the composite. Both the filament and matrix may thus be controlled to produce greater selection of the desired strength and stress characteristics for the composite at any radius and thus the desired characteristics throughout the wheel. Circumferentially continuous filaments may obviously be either continuous rings or continuously wound filaments having a continuous length of at least about one complete circumference thereby to provide the desired circumferential strength.

I claim:

1. A rotary structure such as a high-energy, high-speed flywheel consisting of continuous circumferentially extending filaments or the like, and a matrix filling the voids among the filaments, at least one characteristic of the matrix varying between inner and outer diameters of the structure to provide a controlled strength gradient and modulus ratio from inner to outer radius such characteristics being matrix material, proportion of matrix to filament, and matrix cure.

2. A structure as in claim 1 in which the matrix control is effected by varying the proportion of matrix to filaments at different radii.

3. A structure as in claim 1 in which the matrix control is effected by varying the material of the matrix from inner to outer radius.

4. A structure as in claim 1 in which the matrix is a curable material and the matrix control is effected by varying the curing of the material between inner and outer radii.

5. A structure as in claim 1 in which the filaments also vary from inner to outer diameter.

6. A rotary structure such as a flywheel having a plurality of substantially concentric, circumferentially continuous filaments, and a matrix bonding said filaments into a wheel, the matrix changing between inner and outer radius of the wheel in at least one of the characteristics of matrix material, proportion of matrix to filament, or matrix cure, thereby to change the strength-strain characteristics of the composite of filaments and matrix at different diameters.

7. A rotary structure as in claim 6 in which the filament material is also varied at different radii.